3,037,332
MACHINE TOOL SIZING DEVICE

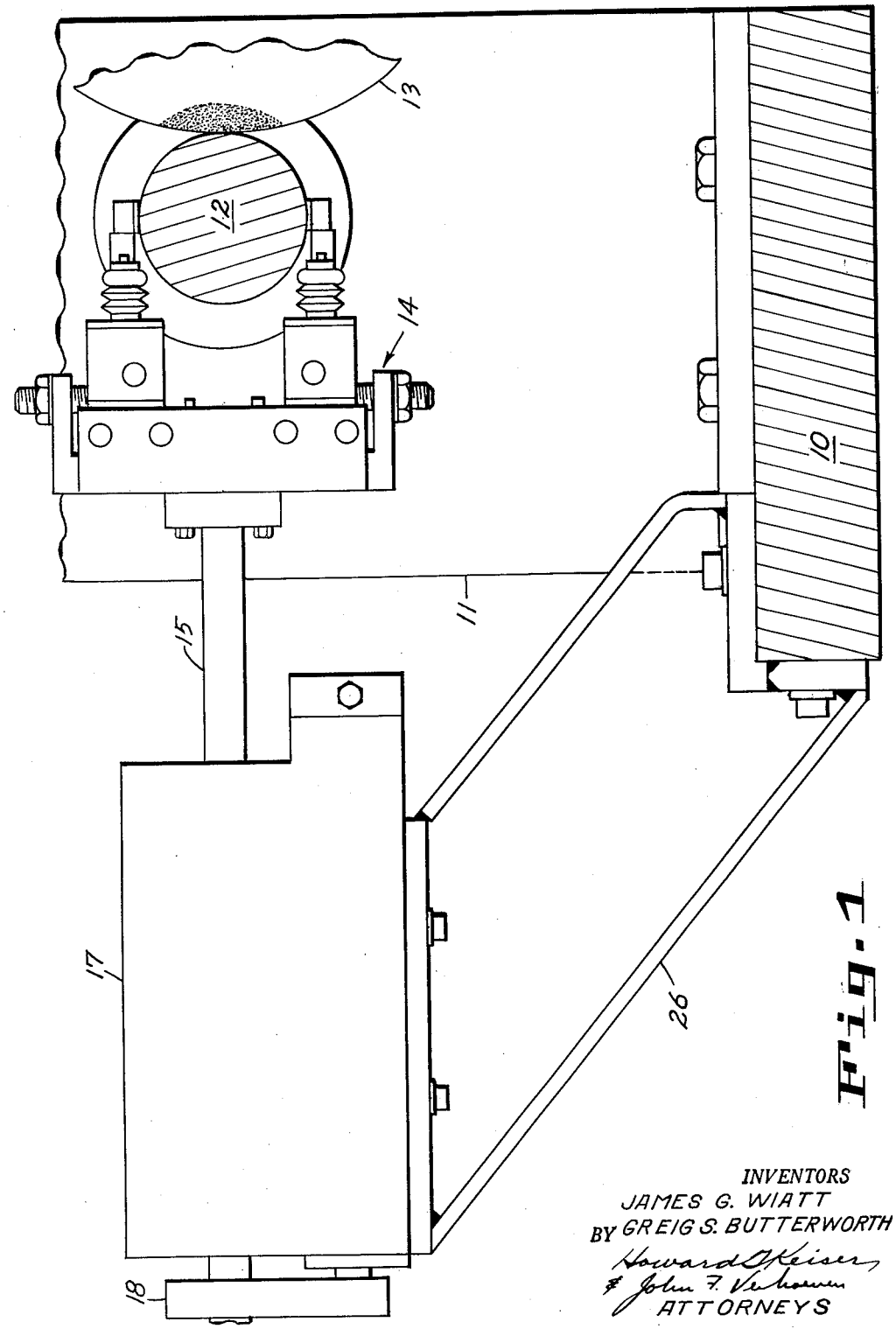

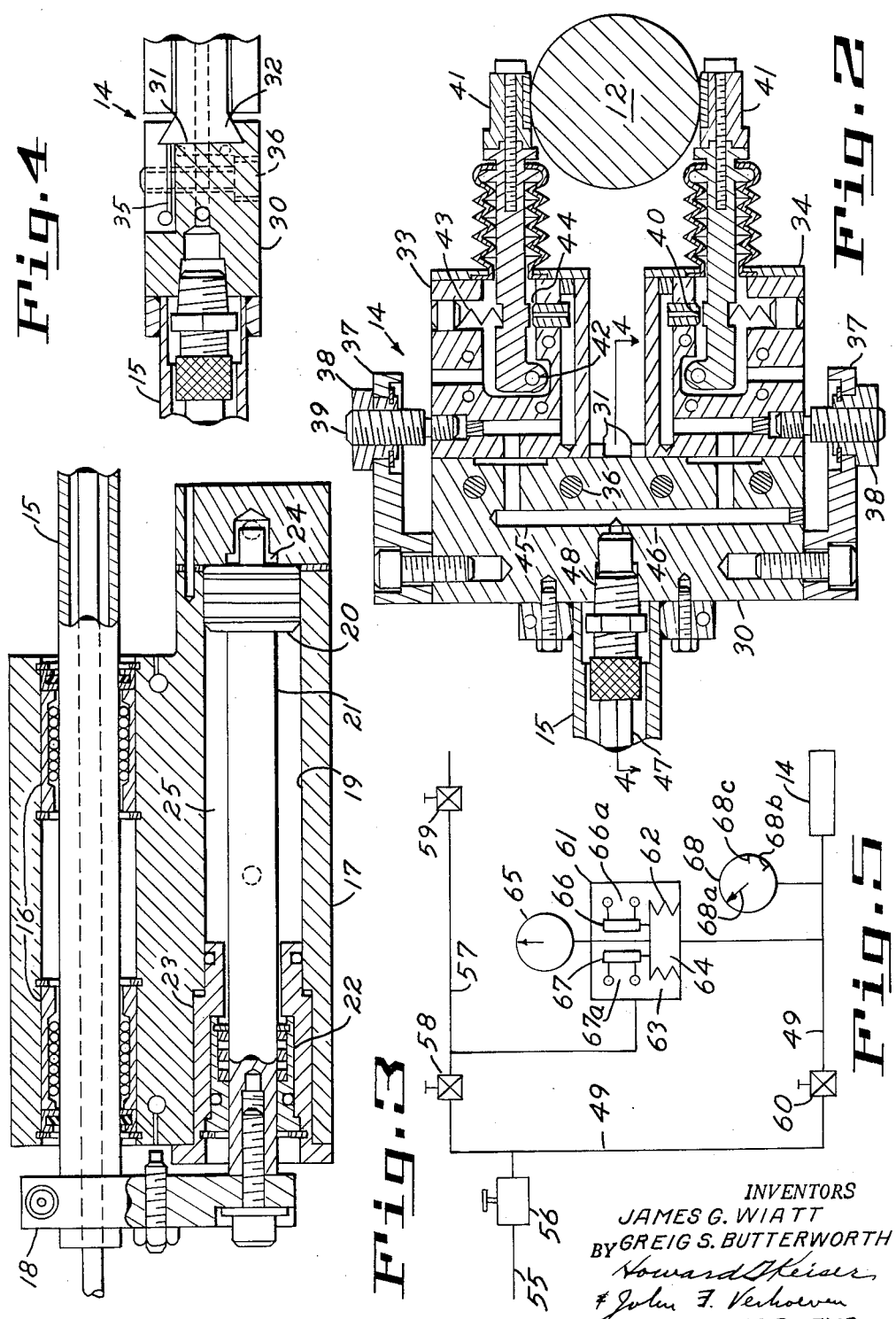

James G. Wiatt, Cincinnati, and Greig S. Butterworth, Columbus, Ohio, assignors to The Cincinnati Milling Machine Co., Cincinnati, Ohio, a corporation of Ohio
Filed Feb. 8, 1960, Ser. No. 7,293
3 Claims. (Cl. 51—165)

The present invention relates to a device for sizing in-process workpieces in a machine tool.

Many in-process sizing devices firmly engage the workpiece for accurate location of the sensing element relative to the workpiece. In some applications, however, this firm contact of the sizing device with the workpiece can deflect the workpiece enough to affect the conformation of the finished workpiece. To avoid this, in-process sizing devices have been produced which sense a workpiece without locating engagement therewith, the sizing device being mounted on the machine tool in a manner to maintain the device generally in proper relation to the workpiece. Usually these latter devices have two sensing elements in opposed relation to sense the workpiece, and means responsive to the relative position of both sensing elements to the workpiece to indicate the size of the workpiece. While it is true that with a workpiece off center relative to the sensing elements of the sizing device, error in size indication caused by one element being closer to the workpiece will be generally offset by error caused by the other element being further from the workpiece, high precision in sizing is best accomplished by maintaining the workpiece in precise centered relation to the sensing elements because the respective sensing elements respond linearly to displacement of the workpiece surface only over a relatively limited range.

It is therefore an object of the present invention to provide an improved in-process sizing device operable without locating engagement with a workpiece and quickly and easily adjustable to render a workpiece in the operating position in precise centered relation with the sensing elements thereof.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a fragmentary view showing the sizing device of the present invention, in elevation, mounted on a machine tool in sensing engagement with a workpiece in the operating position;

FIG. 2 is a view oriented as the view of FIG. 1, showing, in cross section, the head of the sizing device;

FIG. 3 is a view oriented as the view of FIG. 1 showing, in cross section, the mechanism for advancing and retracting the head of the sizing device relative to the workpiece;

FIG. 4 is a view taken on the line 4—4 of FIG. 2; and

FIG. 5 is a schematic diagram of the circuit of the sizing device.

There is shown in FIG. 1 portions of a machine tool which may, for example, be a center type grinding machine having a table 10 mounted on a base (not shown), a headstock 11 mounted on the table to rotate a workpiece 12 in an operating position, and a grinding wheel 13 mounted on the base and movable into engagement with the workpiece 12.

The head of the sizing device, indicated generally at 14, is mounted on one end of a tube 15 which is received in linear bearings 16 mounted in housing 17. The tube 15 extends through the housing and, at the end opposite the head 14, has a bracket 18 connected thereto. The housing 17 has a cylindrical bore 19 which receives the piston 20 carried by piston rod 21. Piston rod 21 extends through a sealing member 22 mounted in sleeve 23 secured in the bore 19 of the housing, and is connected outside the housing to bracket 18. Thus, as fluid under pressure is introduced to chamber 24 on one side of piston 20 and fluid is permitted to escape from chamber 25 on the other side of piston 20, the tube 15 is moved axially to retract the head 14 from the workpiece. Conversely, as pressure is introduced to chamber 25 and permitted to escape from chamber 24, the head 14 is moved into a sizing position, as shown, adjacent the workpiece. The housing 17 is secured to table 10 by bracket 26.

The head 14 has a body 30 which is spaced from the workpiece 12 when in the sizing position. The body has a pair of dovetailed recesses 31 facing the workpiece in which are received the dovetailed portions 32 of two carriers 33 and 34. The body is slotted as at 35 to permit the carriers to be clamped securely in selected positions by the tightening of bolts 36. Secured to the top and bottom of the body are overhanging brackets 37 which rotatably receive nuts 38. Screws 39 secured in the carriers are threadedly received in the nuts whereby rotation of the nuts will adjustably position the carriers 33, 34 on the body 30 when the clamping bolts 36 are not drawn tight.

Each carrier has an orifice 40 and a finger 41 pivotally mounted at 42 in the carrier. The fingers extend in spaced relation parallel to the direction of movement of the gage head to straddle the workpiece 12. The fingers are urged in opposite directions by springs 43 and assume a normal inner position where they close the orifices 40 when not engaged with a workpiece, as, for example, when the head 14 is retracted from the sizing position. When the carriers 33 and 34 are adjusted so that the span between the fingers in their normal inner positions is less than the finished size of a workpiece the fingers will be urged outwardly by engagement with an in-process workpiece to open the orifices, thereby producing a gap 44 between the respective fingers 41 and the orifices 40.

The head 14 has a pair of air discharge passages 45 and 46 terminating, respectively, at the orifices 40. Both of said passages are in communication with air passage 49 defined by a conduit 47, carried in tube 15 and secured in body 30 by fitting 48.

In the pneumatic circuit for the sizing device air under pressure from a source (not shown) is supplied by line 55 through the pressure regulating valve 56 to two branch lines 49 and 57, the branch line 49 operatively connected to the head as previously described and the branch line 57 discharging to the atmosphere. The branch line 57 has two spaced adjustable restrictor valves 58 and 59 so that a constant pressure, adjustable by the setting of the restrictor valves, is established in the line 57 between these valves. Line 49 has an adjustable restrictor valve 60 so that a pressure, which varies in accordance with the amount the orifices are opened by displacement of the fingers from their normal inner positions, is established in line 49 between head 14 and restrictor valve 60.

A differential meter switch 61 has a bellows 62 defining two chambers 63 and 64, chamber 63 being connected to line 57 between the restrictor valves 58 and 59, and chamber 64 connected to line 49 between the restrictor valve 60 and the head 14. As the workpiece diminishes in size, and the fingers move toward their inner normally closed positions, the pressure in line 49 will increase. This will expand the bellows 62, since pressure in line 57 is constant during the sizing operation, and the diminishing size of the workpiece will be indicated on gage 65 operatively connected to the bellows. There is also connected to the bellows two switches 66 and 67 having pairs of terminals 66a and 67a, each of which can be set to close on a selected expansion of the bellows. Terminals 66a and 67a may be connected in the feed circuit of the machine to control the movement of the grinding wheel in accordance with the size of the workpiece.

In the sizing device of the present invention the fingers which define the sensing elements each have a predetermined position assumed when out of contact with a workpiece and each being moved from this position by engagement with the workpiece during sizing. Because of this construction the fingers can be quickly and precisely adjusted relative to a workpiece so that they are equally spaced from the axis of the workpiece. On engagement with a workpiece in the operating position, the fingers will open the orifices an equal amount so that the sizing device will operate in its most linear range. To this end a gage 68 is connected to the air discharge line 49 between the restrictor 60 and the head 14 so that the indicator 68a of the gage (which rotates counterclockwise as pressure in line 49 decreases) will indicate the pressure in line 49. An index mark 68b is placed on the face of the gage dial at a first reference pressure produced in line 49 when one carrier, say 33, is backed away from a workpiece (and hence the orifice 40 of carrier 33 is closed) and the other carrier 34 is positioned relative to a workpiece of any given size to open the orifice 33 thereof a desired predetermined amount (to produce, for example, a gap of .003). A second index mark 68c is placed on the gage dial at a second reference pressure produced in line 49 when, with carrier 34 still in its adjusted position with a gap of .003 at the orifice thereof, the carrier 33 is adjusted relative to the workpiece so that the gap 44 at orifice 40 thereof is the same, or also .003. Thereafter, with the marked gage 68, the operator can quickly center the sensing elements of the head relative to the workpiece regardless of the size of the workpiece. To accomplish this he merely backs carrier 33 away from a workpiece of desired finished size so that orifice 40 thereof will be closed, and then adjusts carrier 34 until indicator 68a of gage 68 is at index mark 68b. Then, leaving carrier 34 in this position, he adjusts carrier 33 until indicator 68a is at index mark 68c. He then knows, without measuring the size of the gaps, that they are equal and will both be of desired span when a workpiece is ground to finished size. With the sensing elements in symmetrical relation to the workpiece, the sizing device will be operating in its optimum range.

What is claimed is:

1. In a machine tool having means to support a workpiece in an operating position, a sizing device comprising a body mounted on the machine tool and movable into a sizing position spaced from a workpiece in the operating position, a pair of carriers mounted on the body, an orifice in each of said carriers, fingers pivotally connected in the respective carriers adapted to engage the workpiece, said fingers normally urged in opposite directions to positions to close said orifices, said fingers yieldable from said normal positions on engagement with the workpiece to open said orifices in accordance with the amount the fingers are moved, an air discharge line connected to said orifices, means to position each of said carriers to move the respective fingers towards and away from a workpiece in the operating position when the body is in the sizing position, a gage operatively connected to the air discharge line and responsive to the pressure therein, said gage marked to indicate a first reference pressure when one of said orifices is open a predetermined amount and the other orifice is closed and to indicate a second reference pressure when both of said orifices are opened said predetermined amount.

2. In a machine tool having means to support a workpiece in an operating position, a sizing device comprising a body mounted on the machine tool and linearly movable into a sizing position spaced from a workpiece in the operating position, a pair of carriers mounted on the body, an orifice in each of said carriers, a finger pivotally connected to each of said carriers and normally urged inwardly to a position to close said orifice, said fingers adapted to engage opposite sides of the workpiece and yieldable outwardly on engagement with the workpiece to open said orifices in accordance with the amount the fingers move from their normal inner positions, means to position each of said carriers to move the respective fingers towards and away from a workpiece in the operating position when the body is in the sizing position, an air discharge line connected to said orifices, a gage operatively connected to the air discharge line and responsive to the pressure therein, said gage marked to indicate a first reference pressure when one of said orifices is open a predetermined amount and the other orifice is closed and to indicated a second reference pressure when both of said orifices are opened said predetermined amount.

3. In a machine tool having means to support a workpiece in an operating position, a sizing device comprising in combination a pair of extending fingers adapted to contact a workpiece at spaced points on a surface thereof, means to bias the fingers towards said surface, means defining an orifice adjacent each of said fingers, each finger and orifice defining a gap therebetween positioned relative to the finger to close as said finger moves in response to said biasing force, said finger closing the gap when disengaged from a workpiece, an air discharge line in communication with both of said orifices, a gage to measure air pressure in said line, means to adjust one of said gaps when the finger defining said one gap is engaged with the workpiece and the finger defining the other gap is disengaged from the workpiece to produce a pressure in said line varying solely as said one gap varies, an index mark on the gage at a line pressure established by a predetermined gap size for said one gap when the other gap is closed, means to adjust said other gap when both fingers are engaged with the workpiece and said one gap is at said predetermined size to produce a pressure in said line varying solely as said other gap varies, an index mark on the gage at a line pressure established when both gaps are of said predetermined size.

References Cited in the file of this patent

UNITED STATES PATENTS

| | | |
|---|---|---|
| 2,007,507 | Steiner | July 9, 1935 |
| 2,019,066 | Balsiger | Oct. 29, 1935 |